United States Patent
Acosta Aponte et al.

(10) Patent No.: US 11,162,870 B2
(45) Date of Patent: Nov. 2, 2021

(54) METHOD AND APPARATUS FOR DIAGNOSING AN INTERNAL COMBUSTION ENGINE

(71) Applicant: Robert Bosch GmbH, Stuttgart (DE)

(72) Inventors: Axel Javier Acosta Aponte, Stuttgart (DE); Tobias Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 16/534,008

(22) Filed: Aug. 7, 2019

(65) Prior Publication Data

US 2020/0064228 A1 Feb. 27, 2020

(30) Foreign Application Priority Data

Aug. 21, 2018 (DE) .................. 102018214114.2

(51) Int. Cl.
*G01M 15/04* (2006.01)
*G07C 5/08* (2006.01)
*F02B 77/08* (2006.01)

(52) U.S. Cl.
CPC ......... *G01M 15/046* (2013.01); *F02B 77/083* (2013.01); *G07C 5/0808* (2013.01)

(58) Field of Classification Search
CPC .................. G01M 15/046; G01M 13/045; G07C 5/0808; F02B 77/083; F02D 41/22
See application file for complete search history.

*Primary Examiner* — Michael V Kerrigan
(74) *Attorney, Agent, or Firm* — Norton Rose Fulbright Us LLP; Gerard Messina (57) ABSTRACT

An apparatus and a method for diagnosing an internal combustion engine for a vehicle, the apparatus encompassing: a recognition device that is embodied to recognize a shutoff operation of the internal combustion engine while the vehicle is being operated in particular in a normal operating mode; a detection device that is embodied to detect, during the shutoff operation, a part or several parts of a curve for a rotation speed or an inter-tooth time of a crankshaft of the internal combustion engine; a comparison device that is embodied to compare at least one feature of the part or the several parts of the curve, in a comparison, with a comparison feature; and a diagnostic device that is embodied to perform, as a function of a result of the comparison, a diagnosis with regard to a compression loss in at least one cylinder.

13 Claims, 7 Drawing Sheets

METHOD AND APPARATUS FOR DIAGNOSING AN INTERNAL COMBUSTION ENGINE

CROSS REFERENCE

The present application claims the benefit under 35 U.S.C. § 119 of German Patent Application No. DE 102018214114.2 filed on Aug. 21, 2018, which is expressly incorporated herein by reference in its entirety.

FIELD

The present invention relates to a method and an apparatus for diagnosing, in particular for recognizing compression loss in a cylinder of, an internal combustion engine.

BACKGROUND INFORMATION

Conventional methods for recognizing compression loss use a compression test as part of a service facility diagnosis function. In that context, inter-tooth times of a crankshaft are recorded while the internal combustion engine is turned over with the injection system deactivated. An evaluation of the inter-tooth times allows compression loss in a specific cylinder to be recognized.

It is desirable also to detect compression losses externally to a service facility diagnosis function.

SUMMARY

The present invention may accomplish this.

"Normal" operation will refer hereinafter to an operating mode in which, in particular, there is no influence on or application of control to the operating mode of an internal combustion engine for diagnostic purposes.

In the method for diagnosing the internal combustion engine of a vehicle, a shutoff operation of the internal combustion engine is recognized while the vehicle is being operated in particular in normal operating mode; a part and/or several parts of a curve for a rotation speed or an inter-tooth time of a crankshaft of the internal combustion engine being detected during the shutoff operation; at least one feature of the part and/or several parts of the curve being compared, in a comparison, with at least one comparison feature; and a diagnosis with reference to a compression loss in at least one cylinder being performed as a function of a result of the comparison. The diagnosis is thus also possible in normal operating mode during operation-related shutoff operations, i.e., not during predefined turnover of the engine by an external machine, e.g., a starter, within a service facility diagnosis function.

It is particularly advantageous if at least one feature that characterizes a compression and/or expansion quality is determined. Necessary features regarding compression quality can be extracted in simple fashion from detected parts of the rotation speed and/or inter-tooth time. These features can be present in the time signal directly as amplitude values or, after a particular transformation, e.g., into the frequency domain, as spectral values, or after calculation of coefficients of an appropriate model. The compression loss is thus possible to determine from a signal of a crankshaft sensor or rotation speed sensor that is present in any case, with no additional sensor for measuring an internal cylinder pressure.

It is particularly advantageous if a compression loss is diagnosed when a difference between at least one feature and at least one comparison feature exceeds a decision threshold. When compression losses occur, these features for the most part differ only as a result of the difference in compression and/or expansion quality which is present. Robust diagnosis is thus possible.

It is particularly advantageous if an indicator for determining a difference between the feature and comparison feature is determined. This is an efficient capability for pairwise similarity calculation between the curves. It is particularly advantageous if a metric that indicates the similarity between the features and comparison features is used. A weighted metric is used, for example, which takes into account various features with different weights in order to ascertain the offset as an indicator of the similarity of the feature and comparison feature.

It is particularly advantageous if a feature of a first part of the curve which is associated with a first cylinder of the internal combustion engine is compared with a comparison feature of a second part of the curve which is associated with a second cylinder of the internal combustion engine. Comparing the curves, and/or their features derived therefrom, of two cylinders of the internal combustion engine makes it possible to recognize a compression loss in as many as half the cylinders.

It is particularly advantageous if the at least one comparison feature is determined as a function of a comparison curve that is at least a part of a curve for a rotation speed or an inter-tooth time of a crankshaft of the internal combustion engine which was acquired during a shutoff operation of the internal combustion engine at a point in time at which the existence of a compression loss was ruled out. This makes it possible to recognize a compression loss in all cylinders of the internal combustion engine by way of a comparison with a comparison curve previously acquired for those cylinders.

It is particularly advantageous if the part of the curve is located in an angle segment of a crankshaft angle which is associated with a top dead center point of a motion of a piston in the cylinder. During the shutoff operation, the inter-tooth times and/or rotation times close to the top dead center point are recorded and are associated with the corresponding cylinder. The reason for this is that during shutoff, only the compression and expansion phases of the cylinder exert a substantial influence on the crankshaft. The angle segments around the top dead center point thus represent the greatest influences of those two cylinder phases on the measured variable.

It is particularly advantageous if only parts from a speed range, out of the total rotation-speed range, in which the difference is greater than a dissimiliarity threshold value, are used. Classification is improved thanks to the increased dissimiliarity between the features of cylinders affected by compression loss and those not affected by compression loss.

It is particularly advantageous if, in the shutoff operation, the internal combustion engine is stopped from an idle state. This enables particularly good recognition.

It is particularly advantageous to utilize learning-capable optimization methods, data-driven models, and/or algorithms in order to establish an optimum decision threshold and/or to define an association between a feature and a compression and expansion quality.

It is particularly advantageous if the diagnosis of the internal combustion engine is performed as a function of a comparison of the result with a comparison result for a vehicle of the same model and/or with comparable use in terms of compression loss in at least one cylinder, that comparison being carried out in a computer or computer network remote from the vehicle. This makes possible cloud-based improvement of the diagnosis.

The apparatus for diagnosing the internal combustion engine encompasses: a recognition device that is embodied to recognize a shutoff operation of the internal combustion engine while the vehicle is being operated in particular in a normal operating mode; a detection device that is embodied to detect, during the shutoff operation, a part or several parts of a curve for a rotation speed or an inter-tooth time of a crankshaft of the internal combustion engine; a comparison device that is embodied to compare at least one feature of the part or the several parts of the curve, in a comparison, with a comparison feature; and a diagnostic device that is embodied to perform, as a function of a result of the comparison, a diagnosis with regard to a compression loss in at least one cylinder. Onboard diagnosis during normal operation of the vehicle is thereby possible.

Advantageously, the apparatus encompasses a preprocessing device that is embodied to determine features that characterize a compression and/or expansion quality.

The apparatus is preferably embodied to execute one of the aforesaid methods.

Further advantageous embodiments are evident from the description below and from the figures.

DETAILED DESCRIPTION OF EXAMPLE EMBODIMENTS

Figure 1:
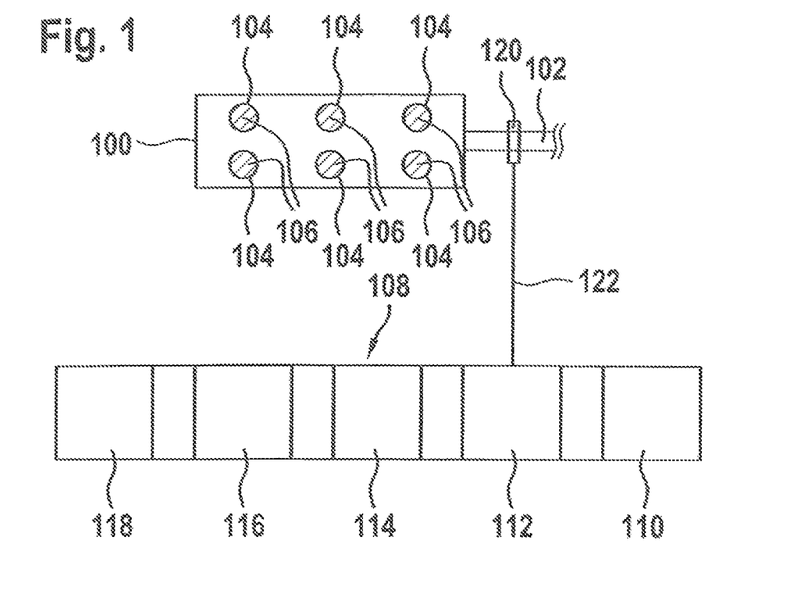
FIG. 1 schematically shows parts of an internal combustion engine of a vehicle.

FIG. 1 schematically shows parts of a vehicle. The vehicle encompasses an internal combustion engine 100 having a crankshaft 102. The internal combustion engine encompasses a plurality of cylinders 104 in which respective pistons 106 can move between a top dead center point and a bottom dead center point in order to drive crankshaft 102.

An apparatus 108 for diagnosis, in particular an apparatus for diagnosis during normal operation of the vehicle, for recognizing a compression loss in at least one of cylinders 104, is schematically depicted in FIG. 1.

Apparatus 108 encompasses a recognition device 110 that is embodied to recognize a shutoff operation of internal combustion engine 100 while the vehicle is driving in normal operating mode. A shutoff operation occurs, for example, when an engine stop is requested. In such a case, ignition and/or fuel delivery is suppressed. This results in a loss of rotation speed of internal combustion engine 100. A corresponding engine stop process is recorded and evaluated by way of actions described below.

Apparatus 108 encompasses a detection device 112 that is embodied to detect, during the shutoff operation, at least a part of a curve for a rotation speed or an inter-tooth time of a crankshaft 102 of internal combustion engine 100 which is associated with each individual one of a plurality of cylinders 104 of internal combustion engine 100.

Apparatus 108 encompasses a preprocessing device 114 that is embodied to extract features of each cylinder of one and/or several shutoff operations from the detected curve. Apparatus 108 encompasses a comparison device 116 that is embodied to compare the features extracted from the curve, in a comparison, with comparison features from a comparison curve or several comparison curves.

Apparatus 108 encompasses a diagnostic device 118 that is embodied to execute, as a function of a result or several results of the comparison, a diagnosis with regard to a compression loss in at least one of cylinders 104. The diagnosis relates to recognition of a compression loss in at least one of cylinders 104.

In order to improve detection robustness, the diagnosis is preferably performed over one or several shutoff operations.

The inter-tooth time or the rotation speed is detected, for example, by way of a crankshaft position sensor or similar sensor 120, which makes inter-tooth times and/or rotation speeds of crankshaft 102 available, in particular via a data lead 122, to detection device 112.

Figure 2:
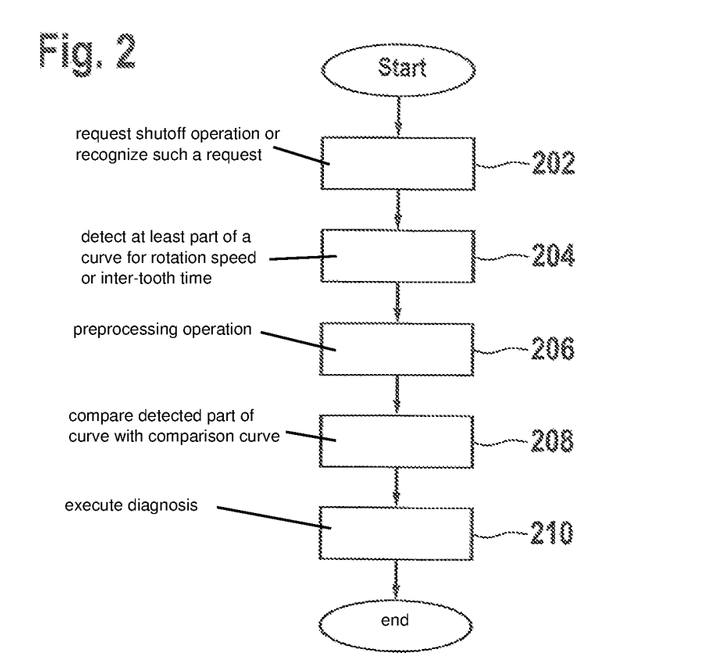
FIG. 2 schematically shows steps in a method for diagnosis during normal operation of the vehicle.

A method for diagnosis will be described below with reference to FIG. 2.

After starting, a step 202 is executed during normal operation of internal combustion engine 100.

In step 202, while the vehicle is in operation a shutoff operation of internal combustion engine 100 is requested or such a request is recognized. Fuel delivery and/or ignition is, for example, suppressed during the shutoff operation. In the shutoff operation, internal combustion engine 100 is stopped, for example, from an idle state.

A step 204 is then executed.

In step 204, during the shutoff operation at least a part of a curve for a rotation speed or an inter-tooth time of a crankshaft of internal combustion engine 100 is detected, said part containing a curve for one or several of cylinders 104 of internal combustion engine 100. More precisely, for a specific cylinder 104, an angle segment that contains its top dead center point and a region around the bottom dead center point is evaluated.

In the context of a plurality of cylinders 104, for example, each of cylinders 104 that is to be diagnosed has associated with it that part of the curve which is located in an angle segment of a crankshaft angle of crankshaft 102 which is associated with the top dead center point of the motion of piston 106 of that cylinder 104.

A step 206 is then executed.

A preprocessing operation is executed in step 206. Detected parts of the curve are processed for noise suppression, to correct missing inter-tooth times, and/or using a fast Fourier transform, in order to generate at least one feature. More precisely, for each of cylinders 104, its feature is determined. In one aspect, features of each cylinder of one and/or several shutoff operations are extracted from the detected curve. Features that characterize a compression and/or expansion quality are preferably determined. "Features" can be amplitude values, normalized amplitude values, spectral values of a frequency range, and/or coefficients of a discrete-time model for stochastic processes. These features can also be determined by machine learning using data-driven models.

Features that, in particular, have a relationship to compression and/or expansion quality are extracted. In particular, these features are compared with comparison features of the comparison curve which have the same relationship to the compression and/or expansion quality.

Provision can be made that only parts from a speed range, out of the total rotation speed range, in which the difference is greater than a dissimilarity threshold value, are used.

Provision can be made that an amplitude of the curve is corrected before the comparison, as a function of a rotation speed of internal combustion engine 100.

A step 208 is then executed.

In step 208, the part of the curve is compared, in a comparison, with a comparison curve. For example, the part of the curve and the comparison curve are compared in terms of their amplitudes or in terms of their shape. More precisely, a feature extracted from the curve, or the features extracted from the curve, are compared, in a comparison, with one or several comparison features from a comparison curve or from several comparison curves.

Several engine stop operations can also be detected, preprocessed, and compared.

For example, an indicator for determining a difference between the feature and comparison feature is determined by way of an appropriate offset calculation. A Euclidian offset between the features from the curve and the comparison features from the comparison curve can be determined in order to calculate a similarity. Alternatively or additionally, data-driven models can be used in order to calculate, by machine learning, an association of the features with the compression and/or expansion quality.

In a first aspect, the one first part of the curve which is associated with a first cylinder of internal combustion engine 100 is compared with a second part of the curve which is associated with a second cylinder of internal combustion engine 100. This means that the comparison curve for the first cylinder is the part of the curve for the second cylinder. If several engine stop processes are used in order to diagnose the second cylinder, the comparison curve of the first cylinder, or the feature obtained therefrom, is stored in order to perform a detection for several stop operations on the second cylinder. This means that the comparison curve for the first cylinder is the part of the curve for the second cylinder, and vice versa. If several engine stop processes are used in order to carry out a diagnosis, the extracted features are stored and associated with the respective cylinder. The stored information is either averaged and compared once, and/or several comparisons are carried out. In particular, the angle segments close to the top dead center points of the respective pistons in the respective cylinders are respectively considered for the curves.

In a further aspect, the comparison curve is a part of a curve for a rotation speed or an inter-tooth time of a crankshaft of internal combustion engine 100 which has been detected during a shutoff operation of internal combustion engine 100 at a point in time at which no compression loss existed. The comparison curve is acquired at a point in time at which it is certain that there is still nothing amiss with the engine, and no compression loss exists. This point in time is located a point in time within the first 500 kilometers to 2,500 kilometers, in particular 2,000 kilometers, and/or within a quantity of 100 to 300, in particular 250, stop operations, after initial registration. In particular, the angle segment close to the top dead center point of the piston of the same cylinder for which the comparison will be carried out, is detected for the comparison curve prior to diagnosis.

A step 210 is then executed.

In step 210, a diagnosis with regard to a compression loss in the cylinder is executed as a function of a result or several results of the comparison.

A compression loss is diagnosed, for example, if a difference between at least one feature and at least one comparison feature exceeds a decision threshold. The decision threshold for the comparison is determined, improved, or optimized, for example, by way of a learning-capable optimization method.

In a further example, the learned data-driven model recognizes the pertinent compression and/or expansion quality and reports a fault in relation thereto.

Several cylinders of internal combustion engine 100 can be diagnosed in one execution cycle of the method. Steps 202 to 210 can be repeated in order to diagnose several cylinders individually. A sequence of steps need not encompass each step in each repetition; the steps can furthermore be executed in different sequences.

The method then ends.

In a cloud-based approach, the results can be compared with results for vehicles of the same model and comparable utilization. The diagnosis of the internal combustion engine is performed in step 210, for example, as a function of a comparison of the result from a vehicle currently being diagnosed with a comparison result for another vehicle of the same model and/or with comparable utilization in terms of compression loss in at least one cylinder 104. This comparison of the results is carried out in a computer or computer network that is remote from the vehicle being diagnosed. The results from the other vehicles are known, for example, from previously performed diagnoses. If the result for the vehicle being diagnosed deviates too greatly from the other results, this indicates, for example, a compression loss. Robustness is thereby enhanced.

Figure 3:
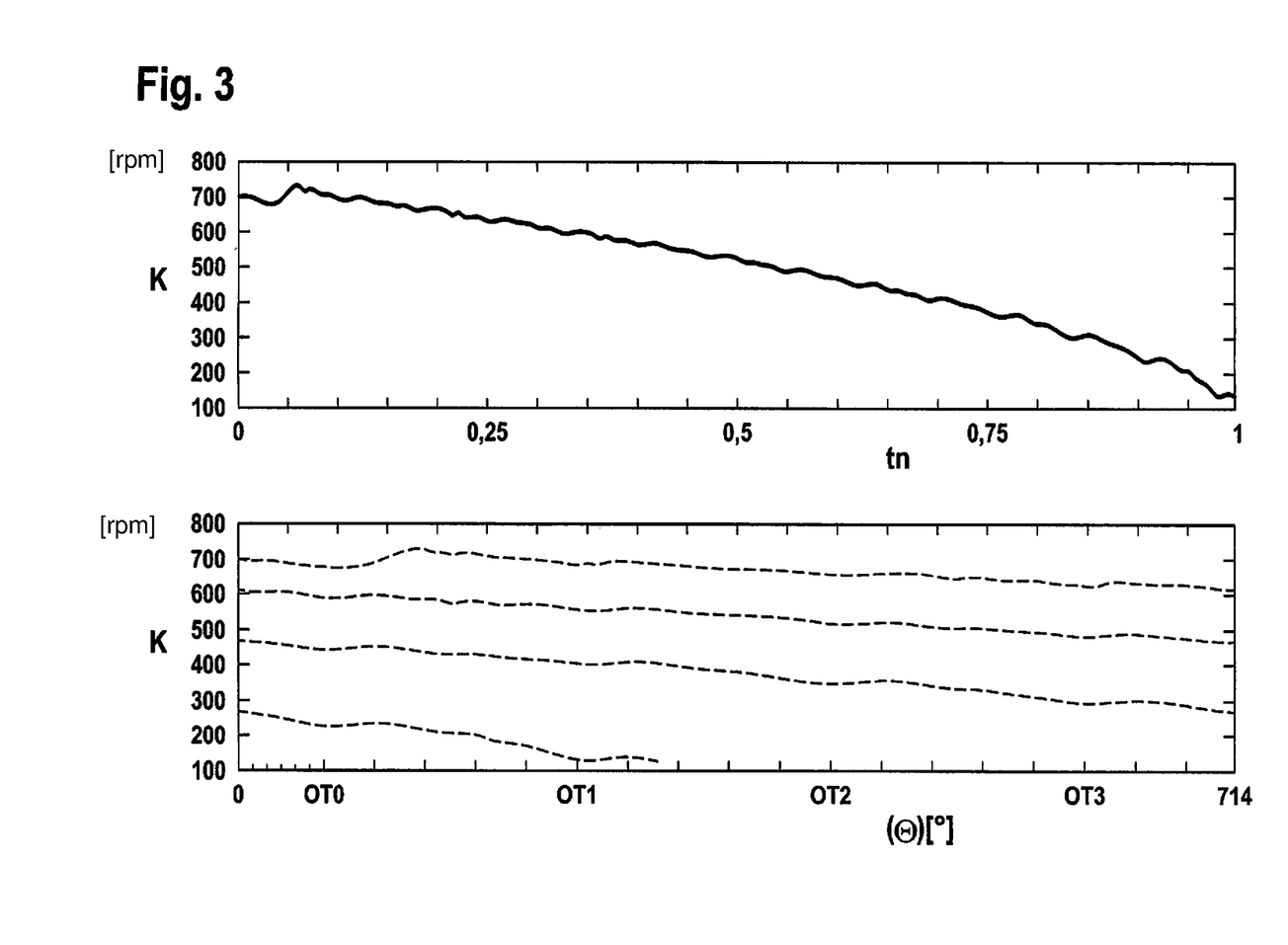
FIG. 3 shows a crankshaft rotation speed curve for a stopping operation.

The upper part of FIG. 3 schematically shows a crankshaft rotation speed curve K during an engine stop, in rpm plotted against normalized time tn. The lower part of FIG. 3 depicts the same crankshaft rotation speed curve K plotted against a crankshaft position $\theta$ in degrees of crankshaft angle, in four phases referred to 720 degrees of crankshaft angle, for a four-stroke engine. FIG. 3 graphically depicts an association between rotation speed during a stop operation, and the phases of the cylinders.

During a shutoff operation, in a compression phase the engine converts kinetic energy into potential energy with an energy loss, and stores that potential energy in the form of gas pressure in the cylinder interior. The crankshaft becomes decelerated. During the shutoff operation, in an expansion phase the engine converts the potential energy in the form of gas pressure into kinetic energy, with a loss. The crankshaft becomes accelerated.

These two phases are defined for each cylinder by engine-specific crankshaft angle segments, and separated by the top dead center points OT0, OT1, OT2, OT3 of the cylinder in question.

Figure 4A:
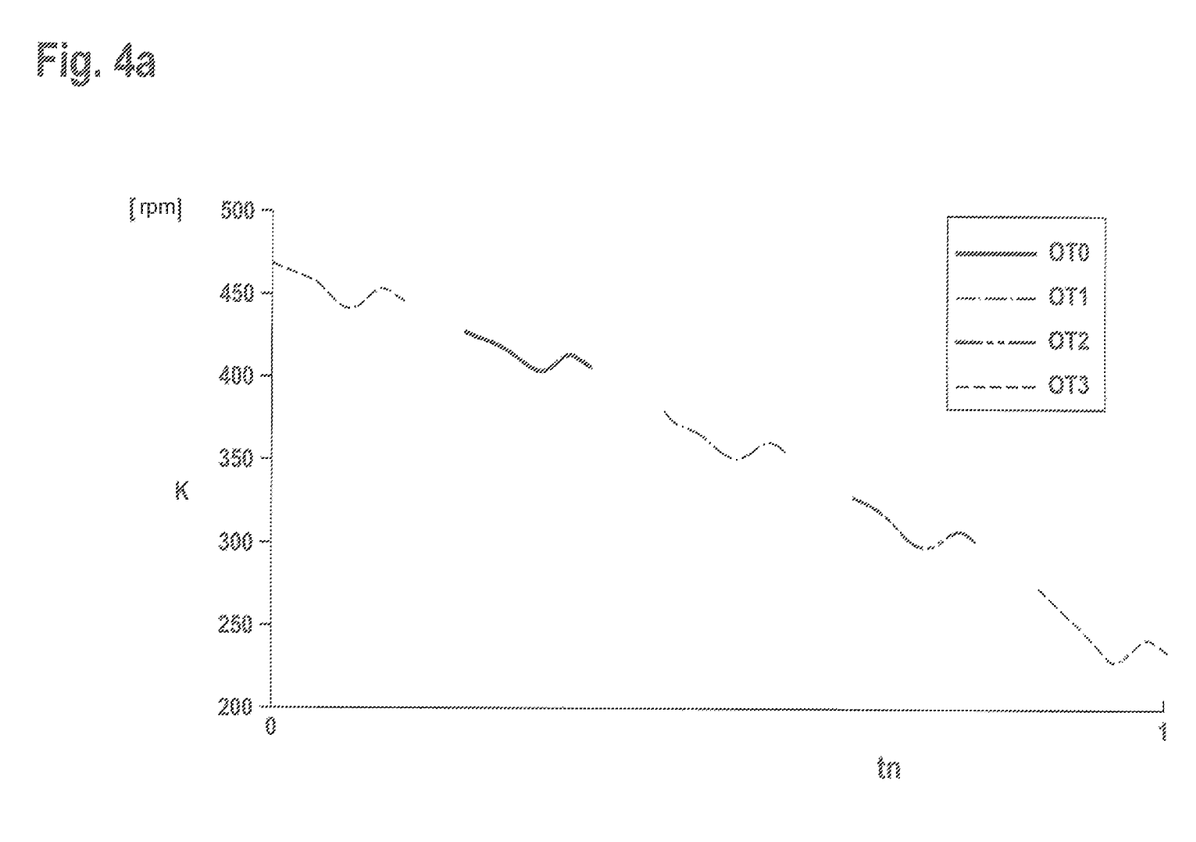
FIGS. 4a-d show crankshaft rotation speed curves in windows.

FIG. 4*a* schematically shows, for four cylinders, a crankshaft rotation speed curve K in rpm plotted against normalized time and divided into windows around the top dead center point [OT] of the respective cylinder. FIG. 4*c* depicts, for the same cylinder, a first curve K1, a second curve K2, and a curve Km, averaged from K1 and K2, of a rotation speed KK compensated with reference to the respective amplitude, in a window in degrees of crankshaft angle around the respective top dead center point. More precisely, curves K1 and K2, normalized mutually independently as to variance and mean, are depicted at various rotation speeds.

Figure 4B:
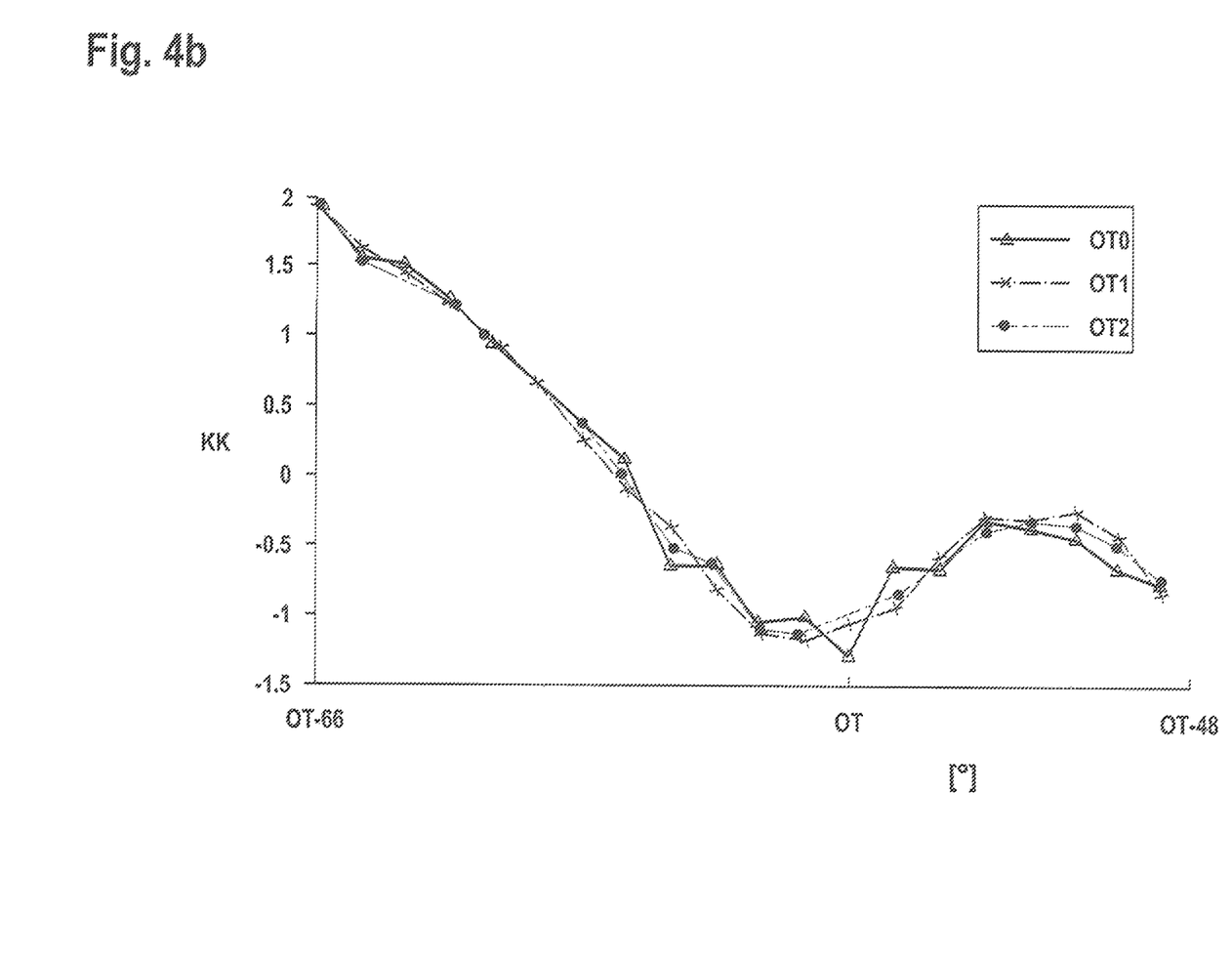
Figure 4C:
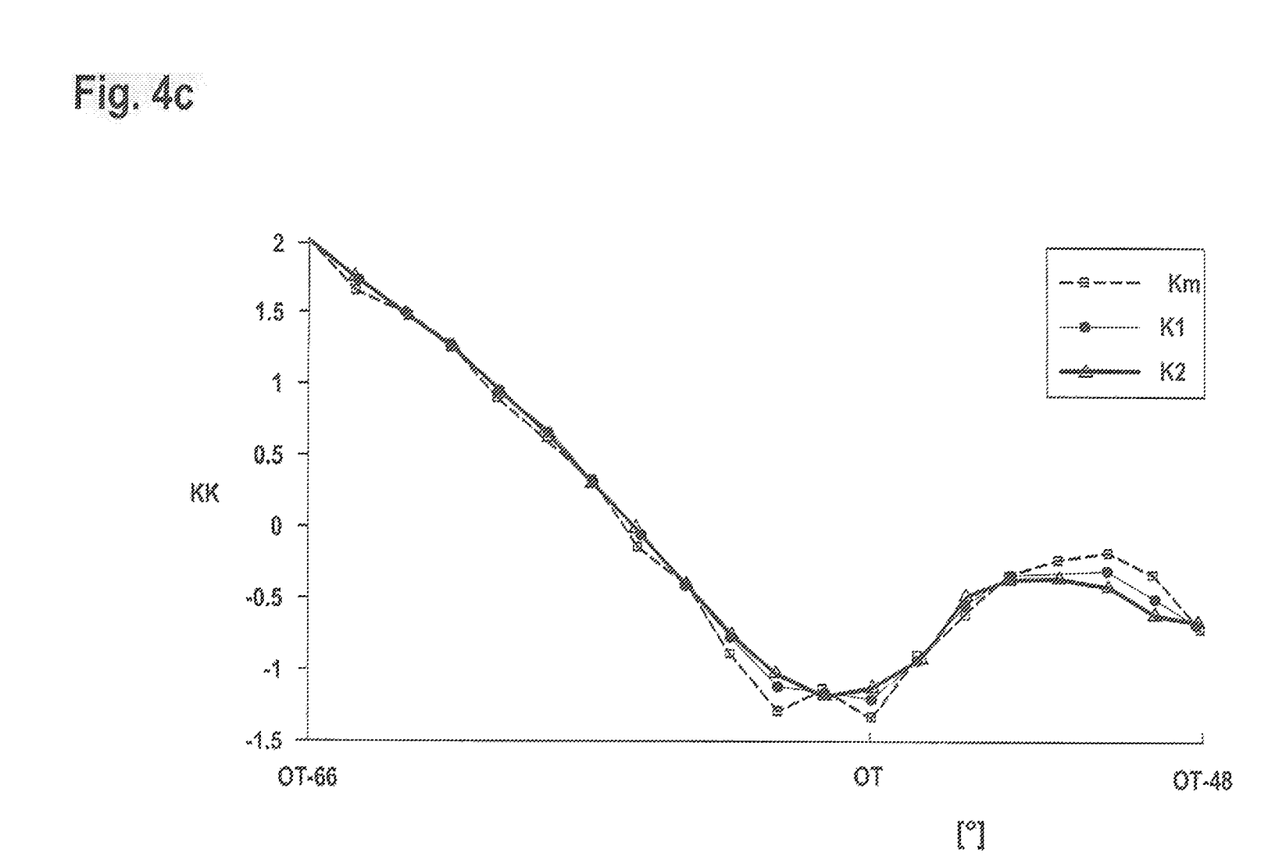

FIG. 4*b* depicts a curve for a rotation speed KK, compensated with reference to the respective amplitude, for a first cylinder OT0, a second cylinder OT1, and a third cylinder OT2, in a window in degrees of crankshaft angle around the respective top dead center point [OT].

Figure 4D:
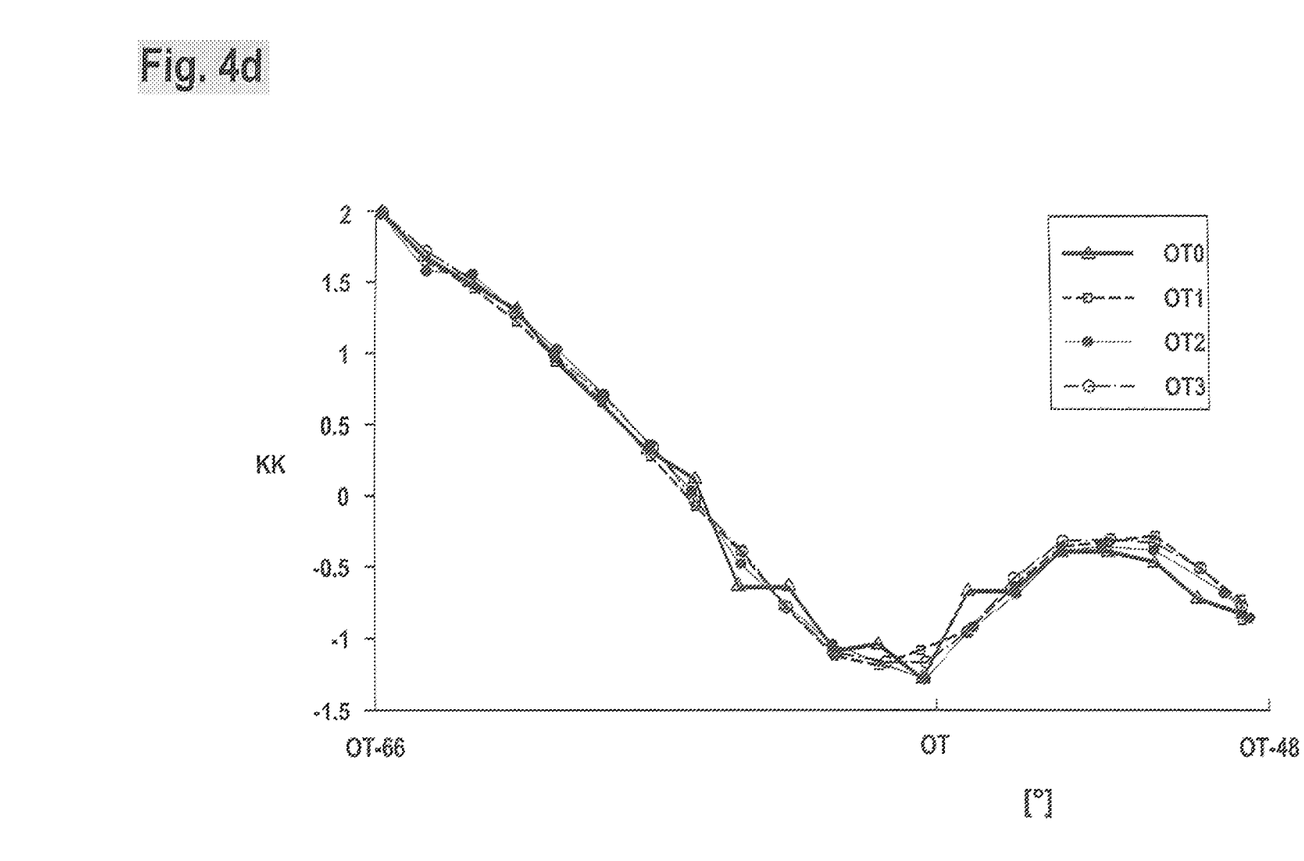

FIG. 4d depicts a curve for a rotation speed KK, compensated with reference to the respective amplitude, for a first cylinder OT0, a second cylinder OT1, and a third cylinder OT2, and an averaged curve for a third cylinder OT3, in a window in degrees of crankshaft angle around the respective top dead center point [OT].

In this example, the compensated amplitude serves as a feature of the compression and expansion quality. Compensation is not absolutely necessary for pairwise similarity calculation of the curves. Compensation makes it possible to compare curves that have different rotation speeds or, better, in terms of their compression and/or expansion quality. The curves can be investigated for each of the cylinders in a manner that is averaged or is not averaged. The curves in the window can be investigated by calculating an indicator for determining a difference between the curves, for example the Euclidean offset, or other methods for determining the dissimilarity of signal curves. The greater the difference between the compression and expansion qualities of two cylinders, the less the similarity between the signal curves of those cylinders. Several stop operations are preferably used in order to carry out an average calculation.

Figure 5:
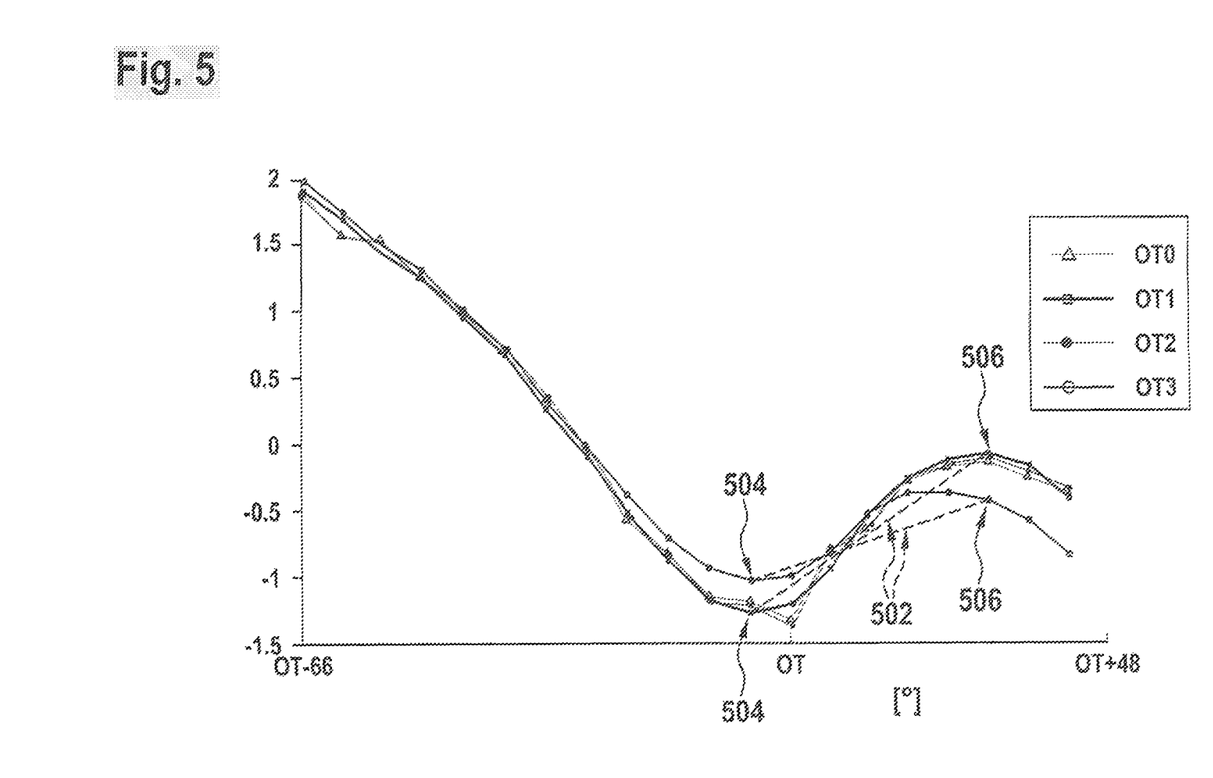
FIG. 5 shows a relationship between local minima and maxima as an example of a feature of a compression quality.

A compression loss at one of the cylinders OT3 is depicted in FIG. 5 as a curve for the compensated rotation speeds KK over the window, in degrees of crankshaft angle for the respective cylinders OT0, OT1, OT2, OT3.

FIG. 5 also depicts a further feature, namely the ratio 502 between local minima 504 and maxima 506 for cylinders OT2 and OT3. At the local minima in the curve, the rotation speed experiences the greatest influence from compression. At the local maxima, the rotation speed experiences the greatest influence from expansion. These regions are defined points having appropriate angle segments for a diagnosis. These features are advantageous; depending on the specific evaluation method, other points or properties of the signal can also be used as a feature.

Especially when compression losses occur simultaneously in all cylinders, the ratio between the compensated and/or noncompensated rotation speeds is calculated, at points that are particularly favorable for detection, before and after the top dead center point for each individual cylinder. The ratio is compared with a ratio previously calibrated for those points. A suitable tolerance range with respect to the calibrated ratio can be provided.

What is claimed is:

1. A method for diagnosing an internal combustion engine of a vehicle, the method comprising the following steps:
   recognizing a shutoff operation of the internal combustion engine while the vehicle is being operated in normal operating mode;
   detecting, during the shutoff operation, a part and/or several parts of a curve for a rotation speed or an inter-tooth time of a crankshaft of the internal combustion engine;
   comparing, in a comparison, at least one feature of the part and/or the several parts of the curve with at least one comparison feature; and
   performing a diagnosis with reference to a compression loss in at least one cylinder of the internal combustion engine as a function of a result of the comparison.

2. The method as recited in claim 1, wherein at least one feature that characterizes a compression and/or expansion quality of the at least one cylinder is determined.

3. The method as recited in claim 1, wherein a compression loss is diagnosed when a difference between the at least one feature and the at least one comparison feature exceeds a decision threshold.

4. The method as recited in claim 3, wherein an indicator for determining the difference between the at least one feature and comparison feature is determined.

5. The method as recited in claim 1, wherein a feature of a first part of the curve which is associated with a first cylinder of the internal combustion engine is compared with a comparison feature of a second part of the curve which is associated with a second cylinder of the internal combustion engine.

6. The method as recited in claim 1, wherein the at least one comparison feature is determined as a function of a comparison curve that is at least a part of a curve for a rotation speed or an inter-tooth time of a crankshaft of the internal combustion engine which was acquired during a shutoff operation of the internal combustion engine at a point in time at which an existence of a compression loss was ruled out.

7. The method as recited in claim 1, wherein the part and/or several parts of the curve is located in an angle segment of a crankshaft angle which is associated with a top dead center point of a motion of a piston in the cylinder.

8. The method as recited in claim 1, wherein only parts from a speed range, out of a total rotation-speed range, in which a difference is greater than a dissimiliarity threshold value, are used.

9. The method as recited in claim 1, wherein in the shutoff operation, the internal combustion engine is stopped from an idle state.

10. The method as recited in claim 1, wherein the diagnosis of the internal combustion engine is performed as a function of a comparison of the result with a comparison result for a vehicle of the same model and/or with comparable use in terms of compression loss in at least one cylinder, that comparison being carried out in a computer or computer network remote from the vehicle.

11. The method as recited in claim 1, wherein learning-capable optimization methods, data-driven models, and/or algorithms are used in order to establish an optimum decision threshold and/or to define an association between a feature and a compression and expansion quality of the at least one cylinder.

12. An apparatus for diagnosing an internal combustion engine for a vehicle, comprising:
   a recognition device that is configured to recognize a shutoff operation of the internal combustion engine while the vehicle is being operated in a normal operating mode;
   a detection device that is configured to detect, during the shutoff operation, a part or several parts of a curve for a rotation speed or an inter-tooth time of a crankshaft of the internal combustion engine;
   a comparison device that is configured to compare at least one feature of the part or the several parts of the curve, in a comparison, with a comparison feature; and
   a diagnostic device that is configured to perform, as a function of a result of the comparison, a diagnosis with regard to a compression loss in at least one cylinder of the internal combustion engine.

13. The apparatus as recited in claim 12, wherein the apparatus includes a preprocessing device that is configured to determine features that characterize a compression and/or expansion quality of the at least one cylinder.

* * * * *